(12) United States Patent
Kinoshita et al.

(10) Patent No.: US 10,057,169 B2
(45) Date of Patent: Aug. 21, 2018

(54) FRAME PROCESSING DEVICE AND FRAME PROCESSING METHOD

(71) Applicant: FUJITSU LIMITED, Kawasaki-shi, Kanagawa (JP)

(72) Inventors: Katsuya Kinoshita, Fukuoka (JP); Tsutomu Noguchi, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 161 days.

(21) Appl. No.: 15/198,002

(22) Filed: Jun. 30, 2016

(65) Prior Publication Data
US 2017/0026290 A1   Jan. 26, 2017

(30) Foreign Application Priority Data

Jul. 23, 2015   (JP) ................................. 2015-145736

(51) Int. Cl.
| | |
|---|---|
| H04L 12/28 | (2006.01) |
| H04L 12/743 | (2013.01) |
| H04L 12/823 | (2013.01) |
| H04L 12/833 | (2013.01) |
| H04L 12/741 | (2013.01) |
| H04L 12/861 | (2013.01) |

(52) U.S. Cl.
CPC ........ H04L 45/7457 (2013.01); H04L 45/745 (2013.01); H04L 47/31 (2013.01); H04L 47/32 (2013.01); H04L 49/90 (2013.01)

(58) Field of Classification Search
CPC ......... H04L 47/10; H04L 47/30; H04L 47/11; H04L 47/12; H04L 2012/5631; H04L 47/15; H04L 47/2441; H04L 47/70; H04L 47/22; H04L 12/5602
USPC ....... 370/351, 356, 389, 360, 363, 229, 230, 370/230.1, 235, 386, 381, 374
See application file for complete search history.

(56) References Cited

U.S. PATENT DOCUMENTS

| | | | |
|---|---|---|---|
| 2003/0123462 A1* | 7/2003 | Kusayanagi | ........ H04L 12/2856 370/401 |
| 2006/0251065 A1 | 11/2006 | Hamamoto et al. | |
| 2009/0207742 A1* | 8/2009 | Suzuyama | ............ H04L 12/462 370/249 |
| 2010/0332679 A1* | 12/2010 | Furuta | ..................... H04L 45/00 709/236 |

FOREIGN PATENT DOCUMENTS

| | | |
|---|---|---|
| JP | 11-122303 | 4/1999 |
| JP | 2006-279820 | 10/2006 |

* cited by examiner

Primary Examiner — Brenda H Pham
(74) Attorney, Agent, or Firm — Staas & Halsey LLP

(57) ABSTRACT

There is provided a frame processing device includes a plurality of output ports; a table in which a destination address is stored in association with an output port; a buffer configured to store a learned frame, an un-learned frame, and a copy frame generated by copying the un-learned frame; a transfer unit configured to read a second frame from the buffer in an order in which the second frame is stored and transfer the second frame to a predetermined output port; a storage configured to store the destination address of the learned frame; and a controller configured to discard the second frame to be transferred by the transfer unit, when the second frame is the un-learned frame and the destination address of the second frame is stored in the storage, wherein the second frame transferred to the plurality of output ports is output as the first frame.

9 Claims, 16 Drawing Sheets

FRAME PROCESSING DEVICE AND FRAME PROCESSING METHOD

CROSS-REFERENCE TO RELATED APPLICATION

This application is based upon and claims the benefit of priority of the prior Japanese Patent Application No. 2015-145736, filed on Jul. 23, 2015, the entire contents of which are incorporated herein by reference.

FIELD

The embodiment discussed herein is related to a frame processing device and a frame processing method.

BACKGROUND

In Ethernet (registered trademark), each device is identified by a media access control (MAC) address. A MAC address is a unique address of each device. In Ethernet, a frame processing device configured to perform layer 2 transfer processing performs frame transfer processing, based on a MAC address included in a frame. In Ethernet, a frame processing device that performs layer 2 transfer processing is, for example, a layer 2 switch.

When a layer 2 switch receives a frame, the layer 2 switch associates the transmission source MAC address of the frame and the reception port of the frame with each other and learns an address. The learned MAC address is associated with the reception port when the MAC address has been learned, and is registered in a MAC address table. In transferring a frame, the layer 2 switch performs a search for the destination MAC address of the frame in the MAC address table and outputs, if there is registration of the destination MAC address, the frame from a port associated therewith in the MAC address table.

A frame the destination MAC address of which has been learned, that is, a frame the destination MAC address of which is registered in the MAC address table, will be hereinafter referred to as a learned frame. Also, a frame the destination MAC address of which is un-learned, that is, a frame the destination MAC address of which is not registered in the MAC address table, will be hereinafter referred to as an un-learned frame.

In frame transfer processing of Ethernet, an un-learned frame undergoes flooding processing. Flooding processing is processing of copying a frame and outputting copy frames of the frame from all of ports other than the reception port thereof. For an un-learned frame, an output port thereof is not known, and therefore, the un-learned frame is output from all of ports other than the reception port, and thus, reaches a device of the destination MAC address.

On the other hand, for a learned frame, an output port thereof is known, the frame is not copied and is output from the output port.

FIG. 1 is a diagram illustrating an example of frame transfer processing of a layer 2 switch. A layer 2 switch P1 includes a learning determination unit P11, a frame copy processing unit P12, a buffer P13, a unicast transfer processing unit P14, and a MAC address table P51.

When a frame is input, the learning determination unit P11 performs a search for the destination MAC address of the frame in the MAC address table P51 and determines whether the frame is a learned frame or an un-learned frame. If the input frame is a learned frame, the learning determination unit P11 outputs the input frame to the buffer P13. If the input frame is an un-learned frame, the learning determination unit P11 outputs the input frame to the frame copy processing unit P12.

When the frame is input from the learning determination unit P11, the frame copy processing unit P12 generates copy frames of the frame of a number corresponding to the number of ports and outputs the copy frames to the buffer P13. Note that frames that are output to the buffer P13 by the frame copy processing unit P12 include an original frame but, for convenience, will be collectively referred to as copy frames.

The buffer P13 is a first-in-first-out (FIFO) queue. The unicast transfer processing unit P14 reads a frame from the buffer P13 and outputs the frame to the output port of the frame.

Japanese Laid-open Patent Publication No. 11-122303 and Japanese Laid-open Patent Publication No. 2006-279820 discusses related art.

SUMMARY

According to an aspect of the invention, a frame processing device includes: a plurality of output ports each from which a first frame having a destination address is output to a network; a table in which the destination address is stored in association with an output port of the plurality of output ports; a buffer configured to store a learned frame for which it is determined that the destination address is registered in the table, an un-learned frame for which it is determined that the destination address is not registered in the table, and a copy frame generated by copying the un-learned frame; a transfer unit configured to read a second frame from the buffer in an order in which the second frame is stored and transfer the second frame to a predetermined output port of the plurality of output ports, the second frame being one of the learned frame, the un-learned frame, or the copy frame; a storage configured to store the destination address of the learned frame; and a controller configured to discard the second frame to be transferred by the transfer unit, when the second frame is the un-learned frame and the destination address of the second frame is stored in the storage, wherein the second frame transferred to the plurality of output ports is output as the first frame.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

In known frame transfer processing, a problem arises in which, if learning is performed on an un-learned frame, reversal of the order of frames between the input order and the output order of the frames occurs. The problem of order reversal occurs such that an un-learned frame that is transferred earlier is overtaken by a learned frame and, as the frame transfer speed increases, the frequency of occurrence of this phenomenon increases. Specifically, it is when learning is performed in a state where an un-learned frame is input that the above-described problem occurs. That is, the MAC address of an un-learned frame is registered in a MAC address table by learning, and therefore, the un-learned frame is processed as an un-learned frame before being registered and is processed as a learned frame after being registered, though the un-learned frame has the same MAC address before and after registration. Therefore, the above-described frame order reversal occurs.

Figure 1:
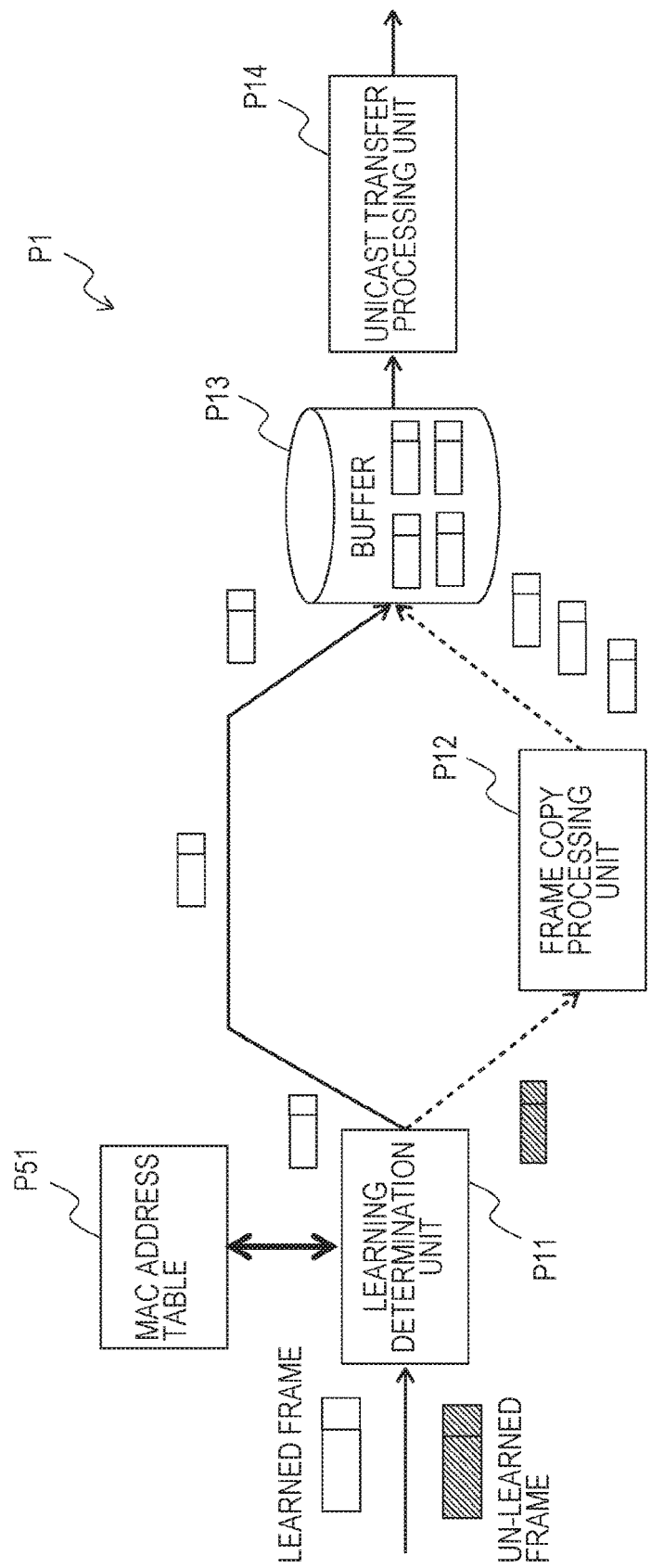
FIG. 1 is a diagram illustrating an example of frame transfer processing of a layer 2 switch.
Figure 2:
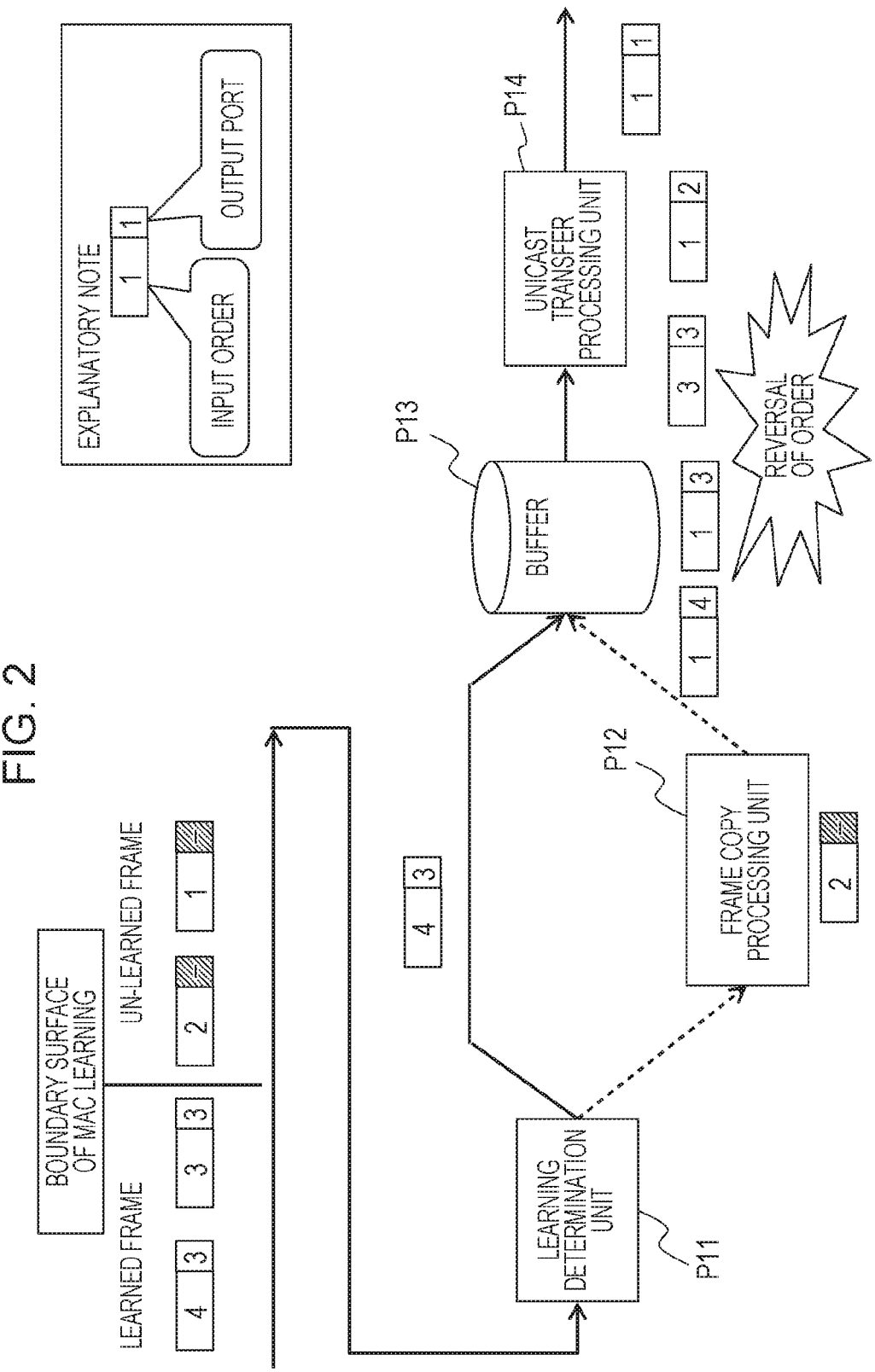
FIG. 2 is a diagram illustrating an example where reversal of the order of frames between the input order and the output order of the frames occurs.

FIG. 2 is a diagram illustrating an example where reversal of the order of frames between the input order and the output order of the frames occurs. In FIG. 2, frames the respective input order numbers of which are 1 to 4 are illustrated. The frames are frames of the same flow, which have the same destination MAC address and transmission source MAC address. Note that each frame in which an output port field is hatched is in an un-learned state.

It is assumed that, when frames the respective input order numbers of which are 1 and 2 are input to the layer 2 switch, the destination MAC address is un-learned and, when a frame the input order number of which is 3 is input thereto, the destination MAC address is learned. That is, the frames the respective input order numbers of which are 1 and 2 are un-learned frames. Frames the respective input order numbers of which are 3 and subsequent numbers are learned frames. A boundary at which the frame learning state changes from an un-learned frame to a learned frame will be hereinafter referred to as a boundary surface of MAC learning.

The frames the respective input order numbers of which are 1 and 2 are un-learned frames, and therefore, are output to the frame copy processing unit P12. The frame copy processing unit P12 copies the frames the respective input order numbers of which are 1 and 2 in accordance with the number of ports, and outputs obtained copy frames to a buffer. In FIG. 2, ports from which un-learned frames are output by flooding are ports 1 to 4. The frame copy processing unit P12 generates three copies of each of the frames the respective input order numbers of which are 1 and 2 and outputs four frames, including an original frame and copy frames to the buffer P13, for each of the frames the respective input order numbers of which are 1 and 2.

The frames the respective input order numbers of which are 3 and 4 are learned frames, and therefore, are output to the buffer P13 not via the frame copy processing unit P12. If a frame input interval is short, there is a probability that processing of generating copy frames of un-learned frames the respective input order numbers of which are 1 and 2 is overtaken by processing of transferring learned frames the respective input order numbers of which are 3 and 4 and a phenomenon in which learned frames the respective input order numbers of which are 3 and subsequent numbers are stored in the buffer P13 before the un-learned frames occurs.

Figure 3:
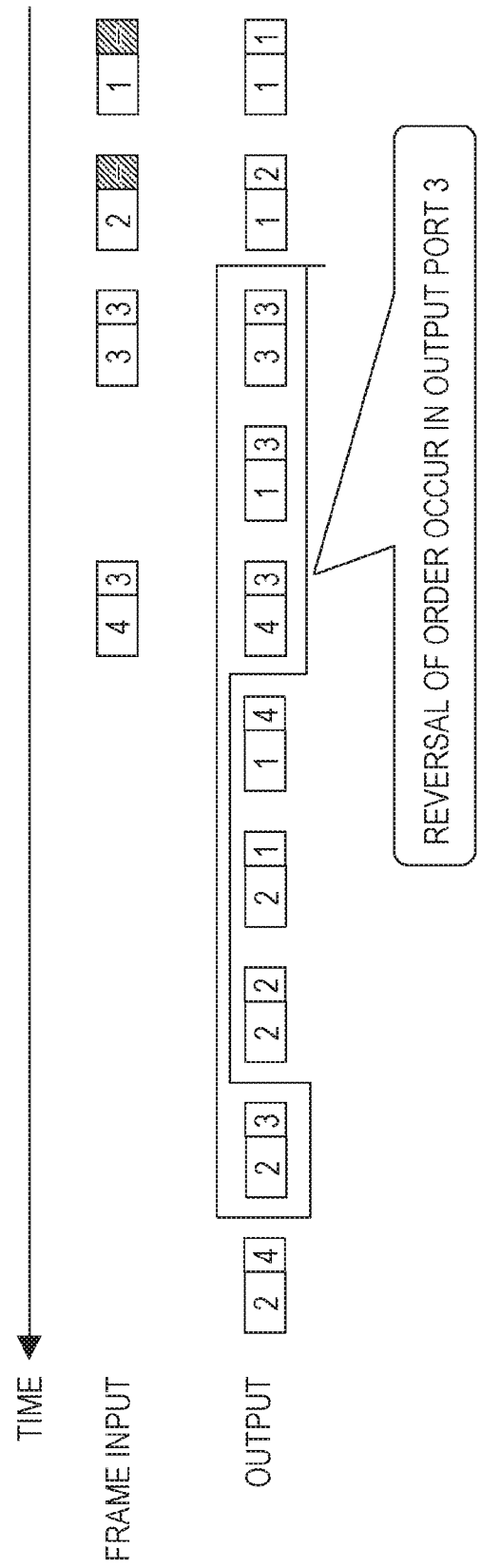
FIG. 3 is a diagram illustrating an example of the input order and the output order of frames in FIG. 2.

FIG. 3 is a diagram illustrating an example of the input order and the output order of frames in FIG. 2. The frames the respective input order numbers of which are 1 and 2 are un-learned frames, and therefore, copies thereof are generated, so that four un-learned frames that are output from ports 1 to 4 as the output ports thereof are achieved.

In the example illustrated in FIG. 3, before all of the copies of the un-learned frame the input order number of which is 1 are stored in the buffer P13, the learned frames the respective input order numbers are 3 and 4 are stored in the buffer P13. Therefore, in FIG. 3, the output order in which frames are output from a port 3 as the output port thereof is the frame the input order number of which is 3, the frame the input order number of which is 1, the frame the input order number of which is 4, and the frame the input order number of which is 2, and for the frames that are output from the port 3, the order of the frames is different between the order in which the frames are input to the port 3 and the order in which the frames are output from the port 3.

Figure 4:
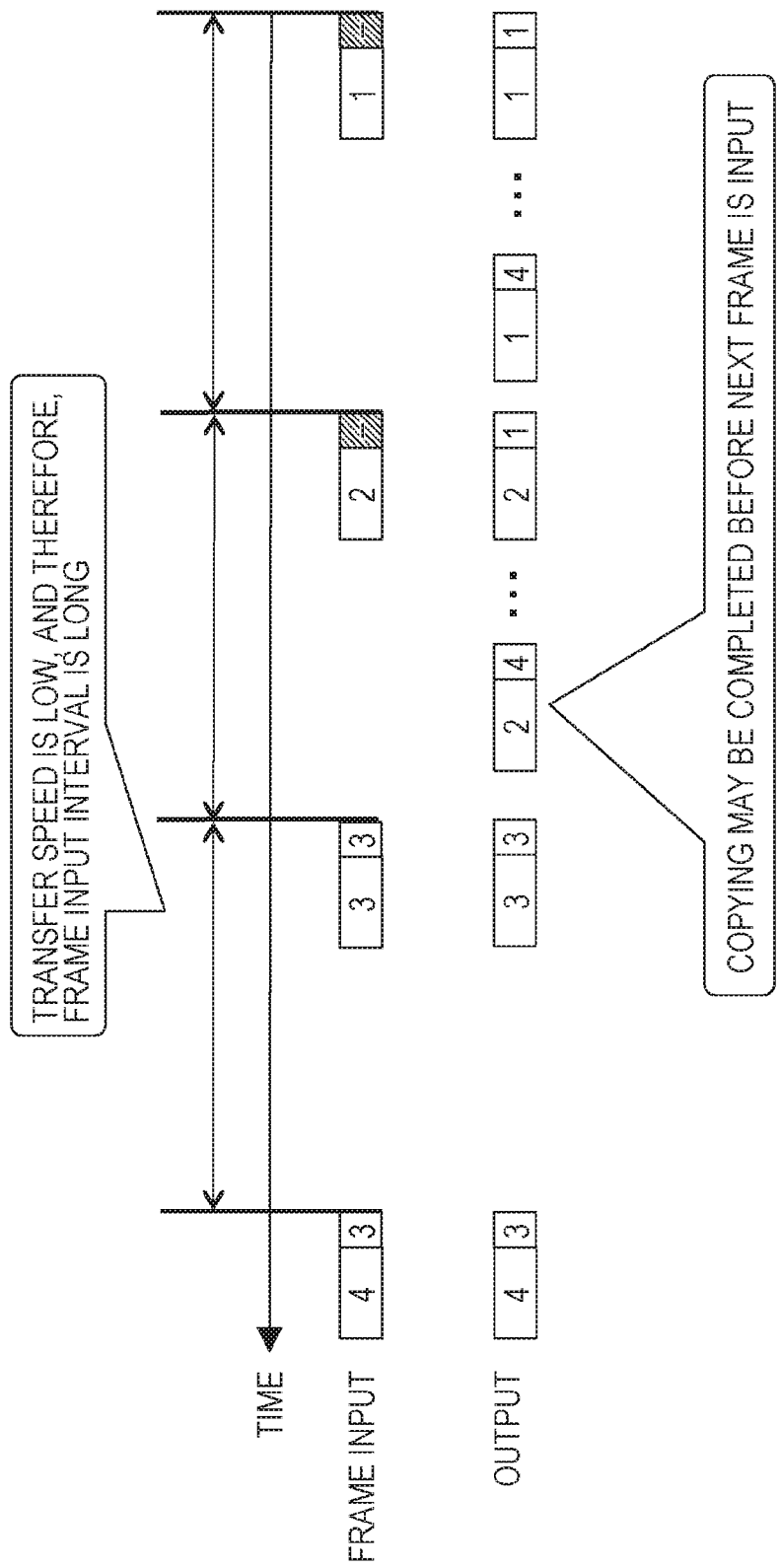
FIG. 4 is a diagram illustrating an example of the input order and the output order of frames when frame transfer speed is low.

FIG. 4 is a diagram illustrating an example of the input order and output order of frames when frame transfer speed is low. In FIG. 4, the frames the respective input order numbers in FIG. 2 of which are 1 to 4 are illustrated.

If the frame transfer speed is low, the frame input interval is long. Therefore, when the frame transfer speed is low, the frame input interval is long, and flooding processing of a single un-learned frame may be completed before a next frame is input. Therefore, in the example illustrated in FIG. 4, flooding processing of the un-learned frame the input order number of which is 2 is completed before the frame the input order number of which is 3 is input. After copy frames of the un-learned frame the input order number of which is 2 are all stored in the buffer P13, the frame the input order number of which is 3 is input, and therefore, reversal of the order of the frames between the input order and the output order of the frames has not occurred.

Accordingly, when the frame transfer speed is low, there is a low probability that reversal of the order of frames between the input order and the output order of the frames occurs around the boundary surface of MAC learning.

Figure 5:
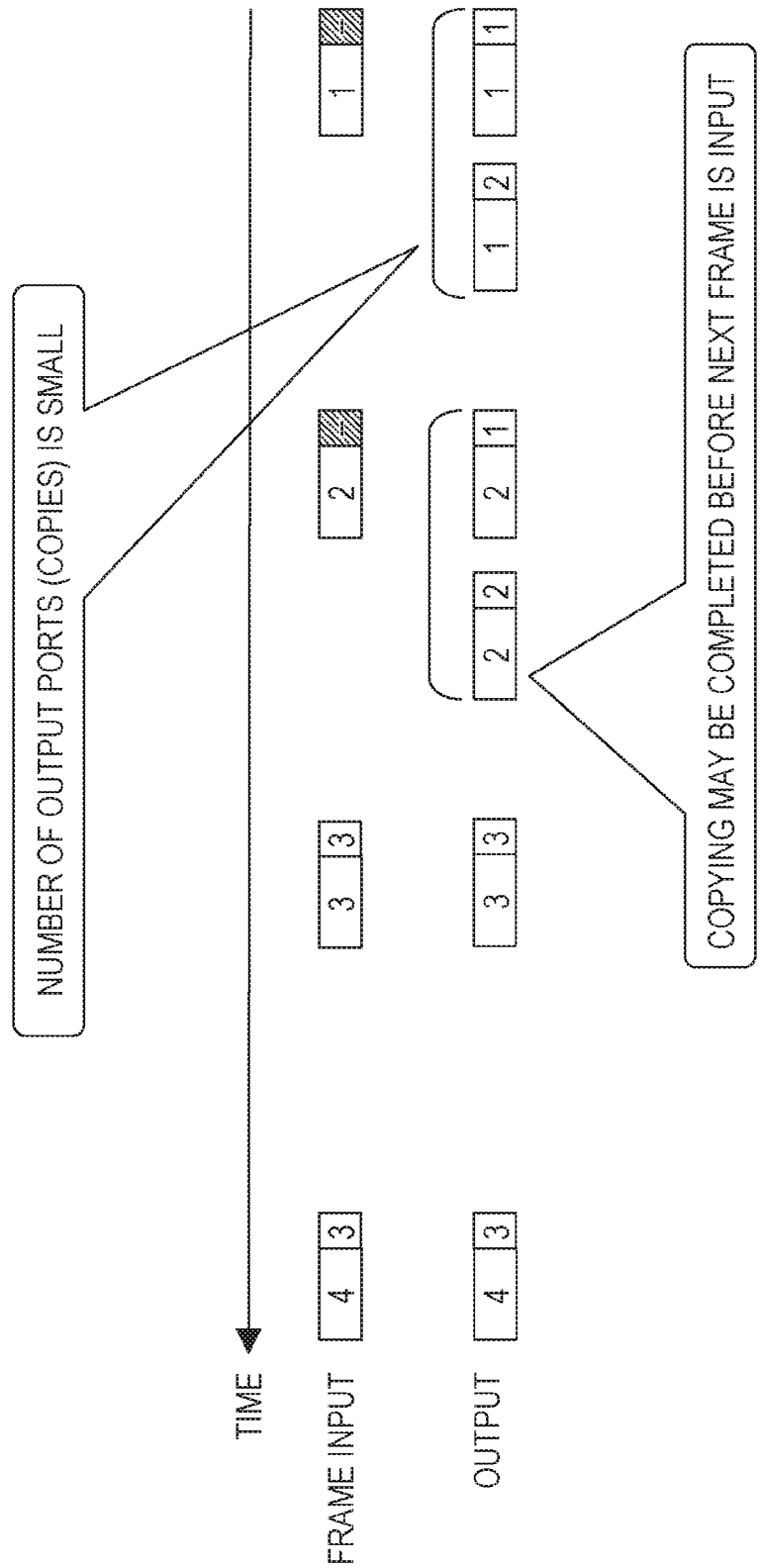
FIG. 5 is a diagram illustrating an example of the input order and the output order of frames when the number of output ports is small.

FIG. 5 is a diagram illustrating an example of the input order and the output order when the number of output ports is small. In FIG. 5, the frames the input order numbers in FIG. 2 of which are 1 to 4 are illustrated.

If the number of output ports is small, it is indicated that the number of copies of a frame in flooding processing is small. Therefore, when the number of output ports is small, it takes a shorter time to perform flooding processing, and flooding processing of a single un-learned frame may be completed before a next frame is input. Therefore, in the example illustrated in FIG. 5, flooding processing of the un-learned frame the input order number of which is 2 is completed before the frame the input order number of which is 3 is input. After copy frames of the un-learned frame the input order number of which is 2 are all stored in the buffer P13, the frame the input order number of which is 3 is input, and therefore, reversal of the order of frames between the input order and the output order of the frames has not occurred.

Accordingly, when the number of output ports is small, there is a low probability that reversal of the order of frames between the input order and the output order of the frames occurs around the boundary surface of MAC learning.

For example, in an Internet protocol (IP) that is a protocol of a higher-level layer than the layer 2, a function of correcting the order of packets is provided. However, for higher-level layers, processing is realized by software, and it takes more time to perform processing. In the future, it is expected that, as the data amount of a network increases, transmission speed increases, and therefore, it is highly likely that, when processing is performed in a higher layer, increase in processing speed does not catch up with the increase in transfer speed. Therefore, in order to respond to increase in data amount and frame transfer speed, it is desired that processing is performed such that reversal of the order of frames between the input order and the output order of the frames does not occur in the level of the layer 2.

However, when the frame transfer speed increases and when, as the data amount increases, the number of ports of the layer 2 switch increases, a probability that reversal of the order of frames between the input order and the output order of the frames occurs increases.

An embodiment of a technology that may enable reduction of the occurrence of reversal of the order of frames between the input order and the output order of the frames will be described below with reference to the accompanying drawings. A configuration according to the embodiment described below is merely an example and the present disclosure is not limited thereto.

Comparative Example

Figure 6:
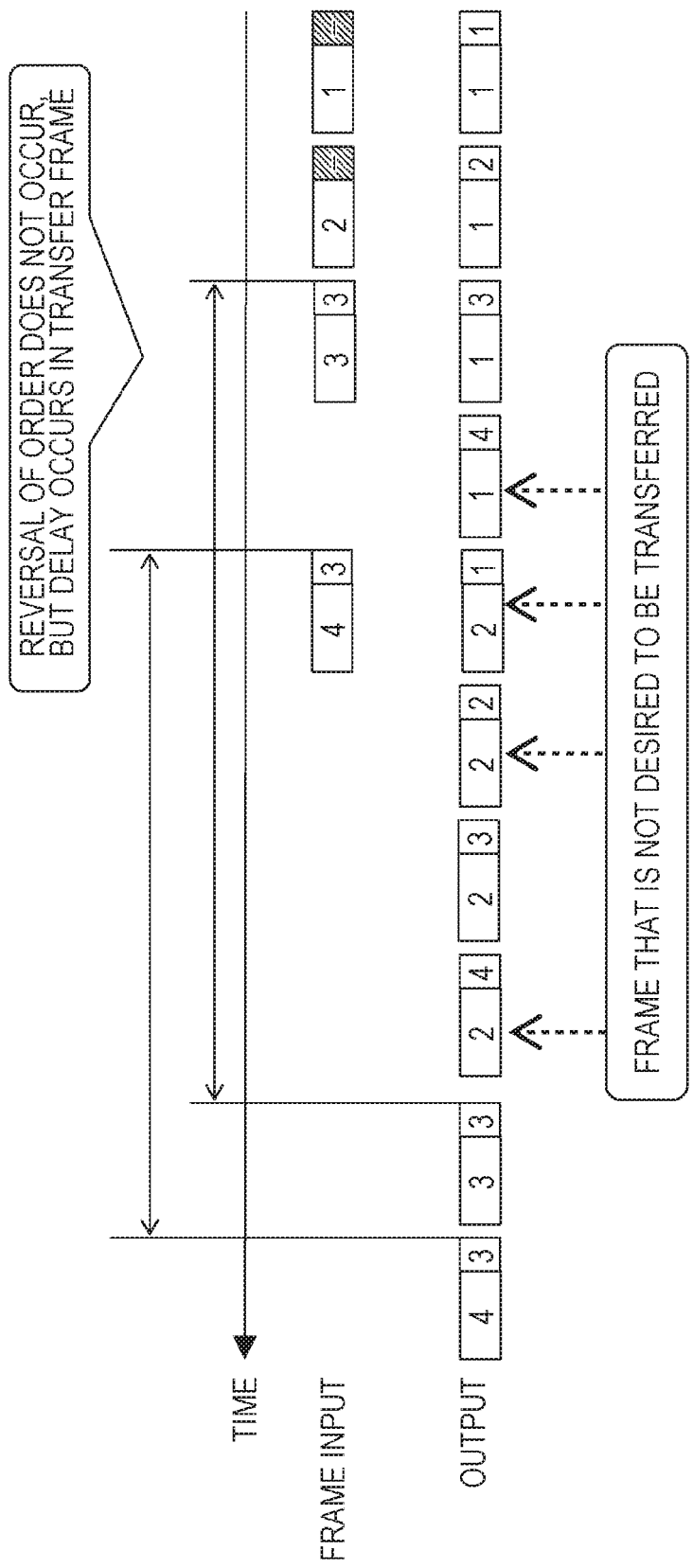
FIG. 6 is a diagram illustrating an example of the input order and the output order of frames in a comparative example.

FIG. 6 is a diagram illustrating an example of the input order and the output order of frames in a comparative example. In FIG. 6, frames the input order numbers in FIG. 2 of which are 1 to 4 are illustrated. The boundary surface of MAC learning is between the frame the input order number of which is 2 and the frame the input order number of which is 3.

In the comparative example, in order not to change the order of frames between the input order and the output order of the frames, the layer 2 switch causes transfer of a learned frame that has been input next to be delayed until flooding processing of an un-learned frame is completed. That is, output of frames the respective input order numbers of which are 3 and subsequent numbers is held in a standby state until the un-learned frames the respective input order numbers of which are 1 and 2 and copy frames thereof are all output.

In the example of FIG. 6, reversal of the order of frames between the input order and the output order of the frames does not occur, but a delay occurs in the frames the respective input order numbers of which are 3 and subsequent numbers, and the frame transfer speed is influenced. Also, as the number of copies of a frame increases, that is, as the number of ports increases, the delay increases, and the size of a memory used for holding learned frames in a standby state also increases.

Also, in the example of FIG. 6, although a destination MAC address has been learned at a time point where the frame the input order number of which is 3 has been input, a frame that is not desired to be transferred is transferred to another output port. In the example of FIG. 6, the frame the input order number of which is 1 and which is output to the port 4, the frames the respective input order numbers of which are 2 and which are output to the ports 1, 2, and 4 are frames that are not desired to be transferred.

A frame is transferred to an output port to which the frame is not desired to be transferred, so that the band of the output port is wasted, and, as a result, the band of the entire network is reduced.

First Embodiment

Figure 7:
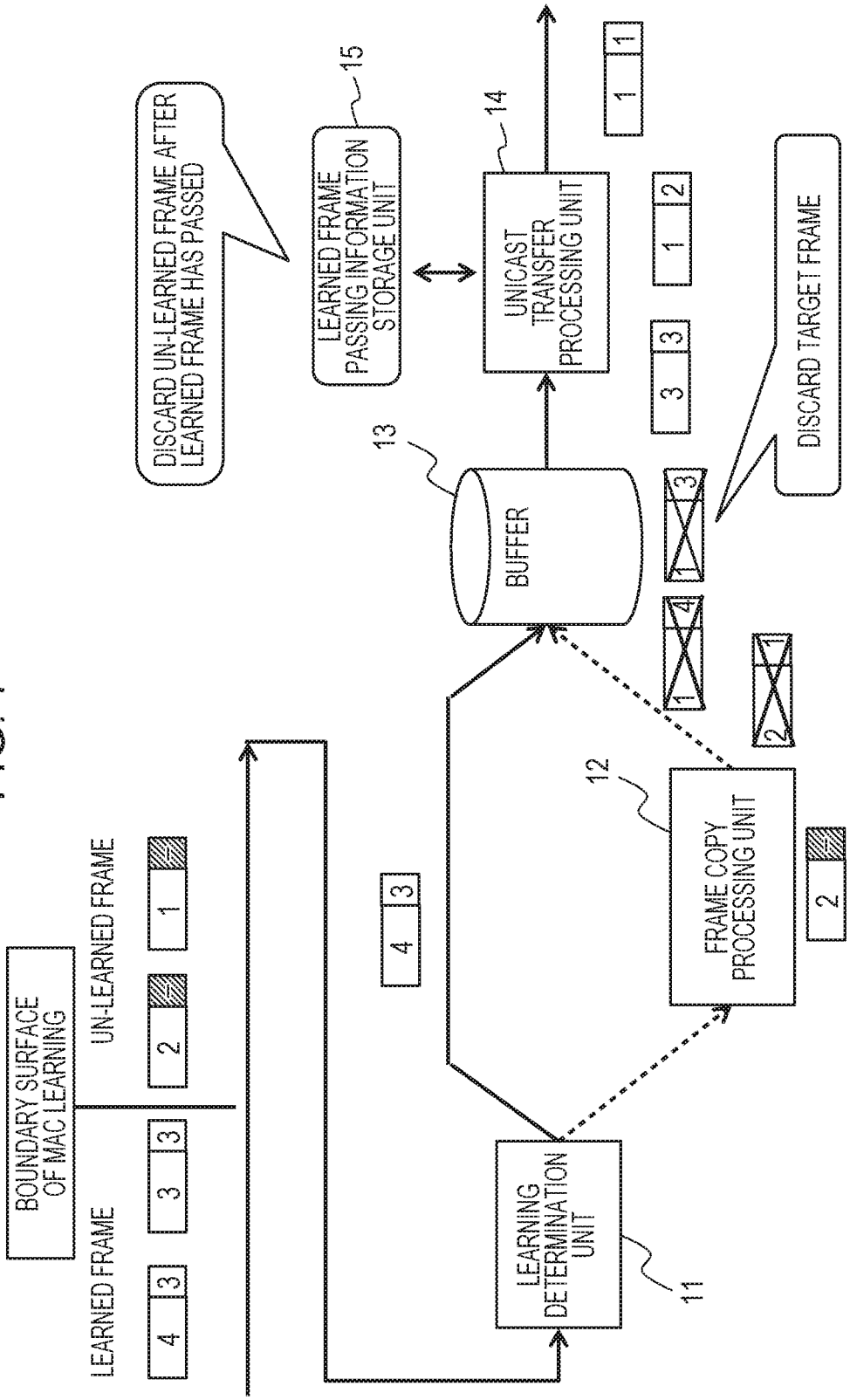
FIG. 7 is a diagram illustrating an example of frame transfer processing of a layer 2 switch according to a first embodiment.

FIG. 7 is a diagram illustrating an example of frame transfer processing of a layer 2 switch according to a first embodiment. The layer 2 switch according to the first embodiment includes, a learning determination unit 11, a frame copy processing unit 12, a buffer 13, and a unicast transfer processing unit 14, a learned frame passing information storage unit 15. The learned frame passing information storage unit 15 holds the destination MAC address of a learned frame that has passed through the unicast transfer processing unit 14, as a history of processing of outputting a learned frame to a network. The destination MAC address of the learned frame that has passed through the unicast transfer processing unit 14 may be referred as learned frame passing information.

In the first embodiment, when an un-learned frame or a copy frame of the un-learned frame is input, the unicast transfer processing unit 14 performs a search for the destination MAC address of the input frame in the learned frame passing information storage unit 15. If there is not the destination MAC address of the input frame in the learned frame passing information storage unit 15, it is indicated that the destination MAC address of the input frame has not been learned yet. If there is not the destination MAC address of the un-learned frame or the copy frame of the un-learned frame in the learned frame passing information storage unit 15, the unicast transfer processing unit 14 transfers the un-learned frame or the copy frame as in a normal manner.

If there is the destination MAC address of the un-learned frame or a copy frame of the un-learned frame in the learned frame passing information storage unit 15, it is indicated that a learned frame the destination MAC address of which is the same as that of the un-learned frame or the copy frame of the un-learned frame has already passed through the unicast transfer processing unit 14. That is, it is indicated that reverse of the order of frames between the input order and the output order of the frames has occurred. Therefore, if there is the destination MAC address of the un-learned frame or the copy frame of the un-learned frame in the learned frame passing information storage unit 15, the unicast transfer processing unit 14 discards the un-learned frame or the copy frame.

Figure 8:
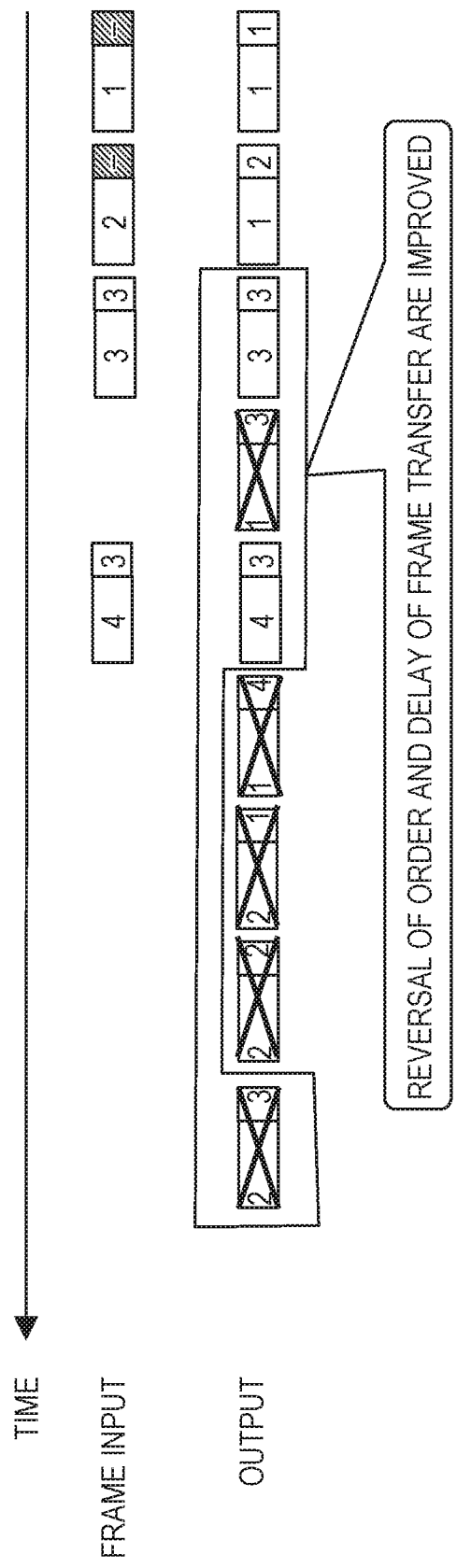
FIG. 8 is a diagram illustrating an example of the input order and the output order of frames in the first embodiment.

FIG. 8 is a diagram illustrating an example of the input order and the output order in the first embodiment. In the example of FIG. 8, it is assumed that the frames the respective input order numbers of which are 1 to 4 all have the same destination MAC address. Also, it is assumed that, among the frames the respective input order numbers of which are 1 to 4, the boundary surface of MAC learning is between the frame the input order number of which is 2 and the frame the input order number of which is 3. Also, output ports in this case are four output ports, that is, output ports 1 to 4.

The frame the input order number of which is 1 and which is an un-learned frame is copied, and thus, four frames the destinations of which are ports 1 to 4 are finally achieved. In the following description, an un-learned frame that is output from the frame copy processing unit 12 and copy frames of the un-learned frames will not be distinguished from one another, and will be hereinafter collectively referred to as un-learned frames. In the example of FIG. 8, before un-learned frames the respective input order numbers of which are 1 are all stored in the buffer 13, the learned frames the respective input order numbers of which are 3 and 4 overtake some of the un-learned frames and are stored in the buffer 13.

Therefore, next to a frame the input order number of which is 1 and the destination port of which is the port 2, a learned frame the input order number of which is 3 and the destination port of which is the port 3 is output. When the learned frame the input order number of which is 3 is passing through the unicast transfer processing unit 14, the unicast transfer processing unit 14 registers the destination MAC address of the frame in the learned frame passing information storage unit 15.

An un-learned frame the input order number of which is 1 and the destination port of which is the port 3 is input to the unicast transfer processing unit 14 next to the learned frame the input order number of which is 3. The destination MAC address of the un-learned frame the input order number of which is 1 and the destination port of which is the port 3 has been already registered in the learned frame passing information storage unit 15. Therefore, the destination MAC address of the un-learned frame the input order number of which is 1 and the destination port of which is the port 3 is discarded by the unicast transfer processing unit 14. Similarly, an un-learned frame the input order number of which is 1 and the destination port of which is the port 4 and all of un-learned frames the respective input order numbers of which are 2 are un-learned frames, the destination MAC addresses thereof are registered in the learned frame passing information storage unit 15, and therefore, the un-leaned frames are discarded by the unicast transfer processing unit 14.

Therefore, in the example of FIG. 8, frames that are output from the port 3 that is an output port to the destination MAC addresses are the frames the respective input order numbers of which are 3 and 4, and reversal of the order of frames between the input order and the output order of the frames has not occurred. Also, the frames the respective input order numbers of which are 3 and 4 are not delayed, and thus, are transferred at high speed.

Note that, in the example of FIG. 8, each of the frames the respective input order numbers of which are 1 and 2 does not reach a destination device, and is handled as a packet loss. However, each lost frame is made up by error code correction, retransmission, and the like in the destination device.

Device Configuration

Figure 9:
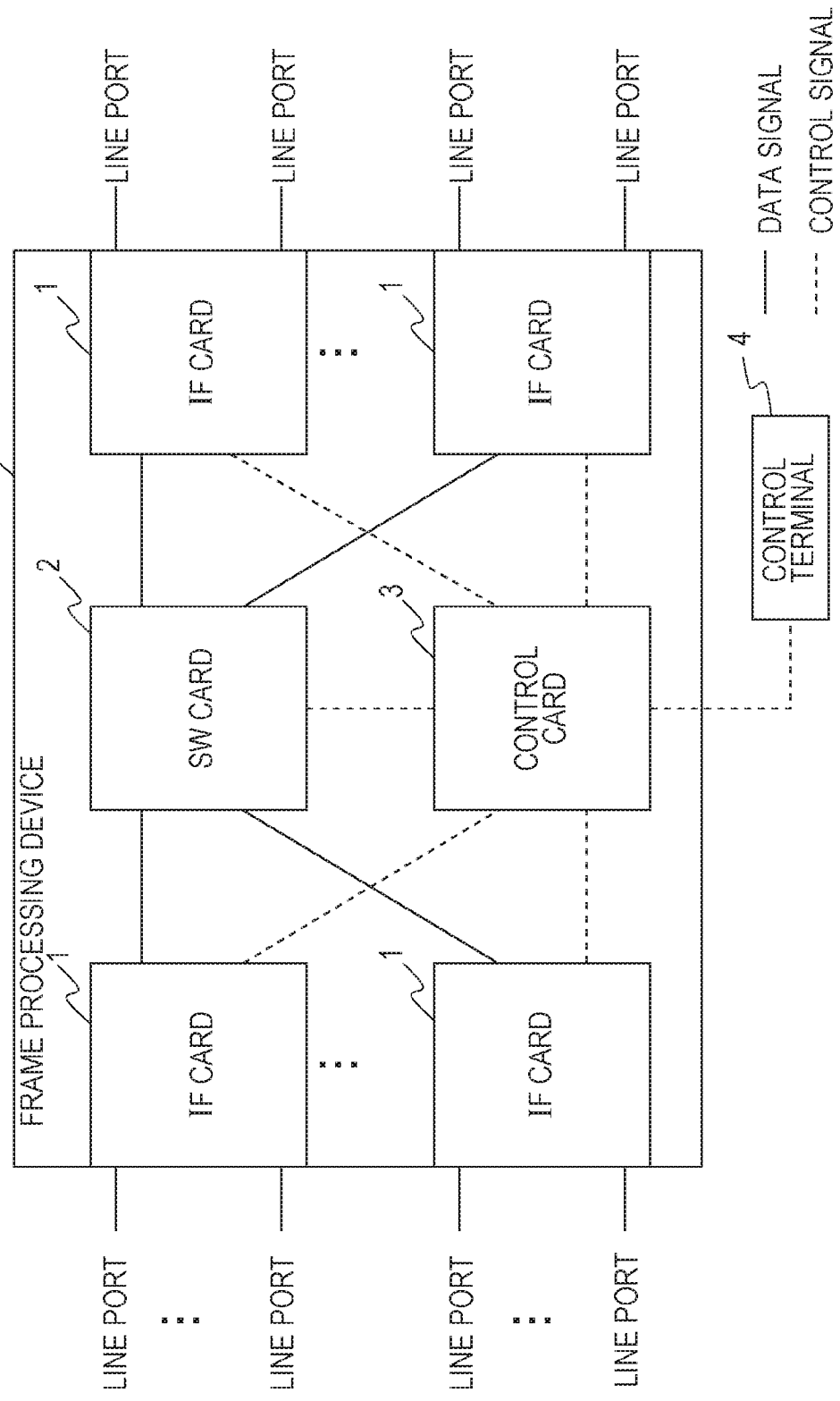
FIG. 9 is a diagram illustrating an example of a configuration of a frame processing device.

FIG. 9 is a diagram illustrating an example of a configuration of a frame processing device 100. The frame processing device 100 is, for example, a device, such as a layer 2 switch, a layer 3 switch, and the like. However, the frame processing device 100 is not limited thereto, but may be an interface card included in a layer 2 switch, a layer 3 switch, or the like. In the first embodiment, assuming that the frame processing device 100 is a chassis-type layer 2 switch, the frame processing device 100 will be described. The frame processing device 100 includes a plurality of IF cards 1, an SW card 2 that relays a packet between the IF cards 1, and a control card 3 that controls each card of the frame processing device 100. The frame copy processing unit 12, the buffer 13, and the unicast transfer processing unit 14 are functions of each of the IF cards 1.

Figure 10:
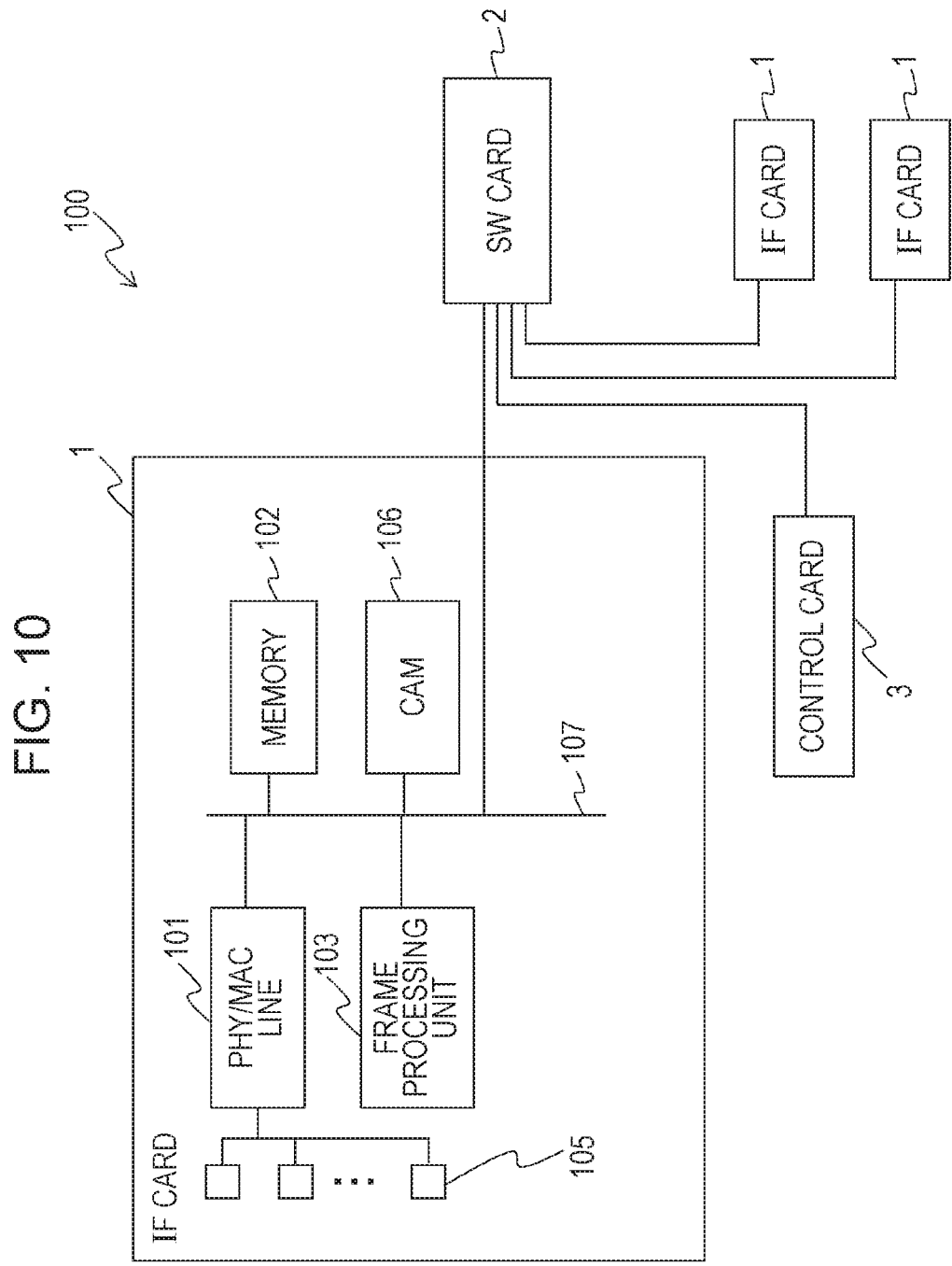
FIG. 10 is a diagram illustrating an example of a hardware configuration of each of IF cards.

FIG. 10 is a diagram illustrating an example of a hardware configuration of each of the IF cards 1. Each of the IF cards 1 includes a physical layer/MAC layer (PHY/MAC) circuit 101, a memory 102, a frame processing unit 103, a plurality of ports 105, and a content addressable memory (CAM) 106. The plurality of ports 105 is coupled to the PHY/MAC circuit 101. The PHY/MAC circuit 101, the memory 102, the frame processing unit 103, and the CAM 106 are coupled with one another via a bus 107.

The PHY/MAC circuit 101 performs termination processing of a physical layer of a reception frame that is input from each of the ports 105 and termination processing of a MAC layer. The memory 102 includes, for example, a volatile memory, such as a static random access memory (SRAM), a dynamic random access memory (DRAM), and the like, and a nonvolatile memory, such as a programmable read only memory (PROM) and the like. Various programs and various types of data are stored in the memory 102.

The frame processing unit 103 is, for example, a processor, such as a network processing unit (NPU) and the like, which performs processing of data related to communication, or a circuit, such as a field-programmable gate array (FPGA) and the like. The frame processing unit 103 processes a frame that has been encoded by the PHY/MAC circuit 101 and a frame that has been transferred from the SW card 2.

The CAM 106 is used as a memory that holds the destination MAC address of a learned frame to be registered in the learned frame passing information storage unit 15. Note that the memory 102 and the CAM 106 are not limited to memories that are mounted in a corresponding single IF card 1 and memories that are externally attached to the IF card 1 may be used by the frame processing unit 103.

Each of the PHY/MAC circuit 101, the memory 102, the frame processing unit 103, and the CAM 106 of the IF card 1 may be an individual device or chip. Also, the IF card 1 may be a single large scale integration (LSI) including the above-described circuits and devices or a plurality of LSIs each including the above-described circuits and devices.

Also, the hardware configuration of the IF card 1 is not limited to the hardware configuration illustrated in FIG. 10, and addition, removal, and exchange of one or more of the components thereof may be performed, as appropriate. Note that, in the first embodiment, assuming a chassis-type layer 2 switch, the description is given, but a pizza-box-type layer 2 switch may be used.

Figure 11:
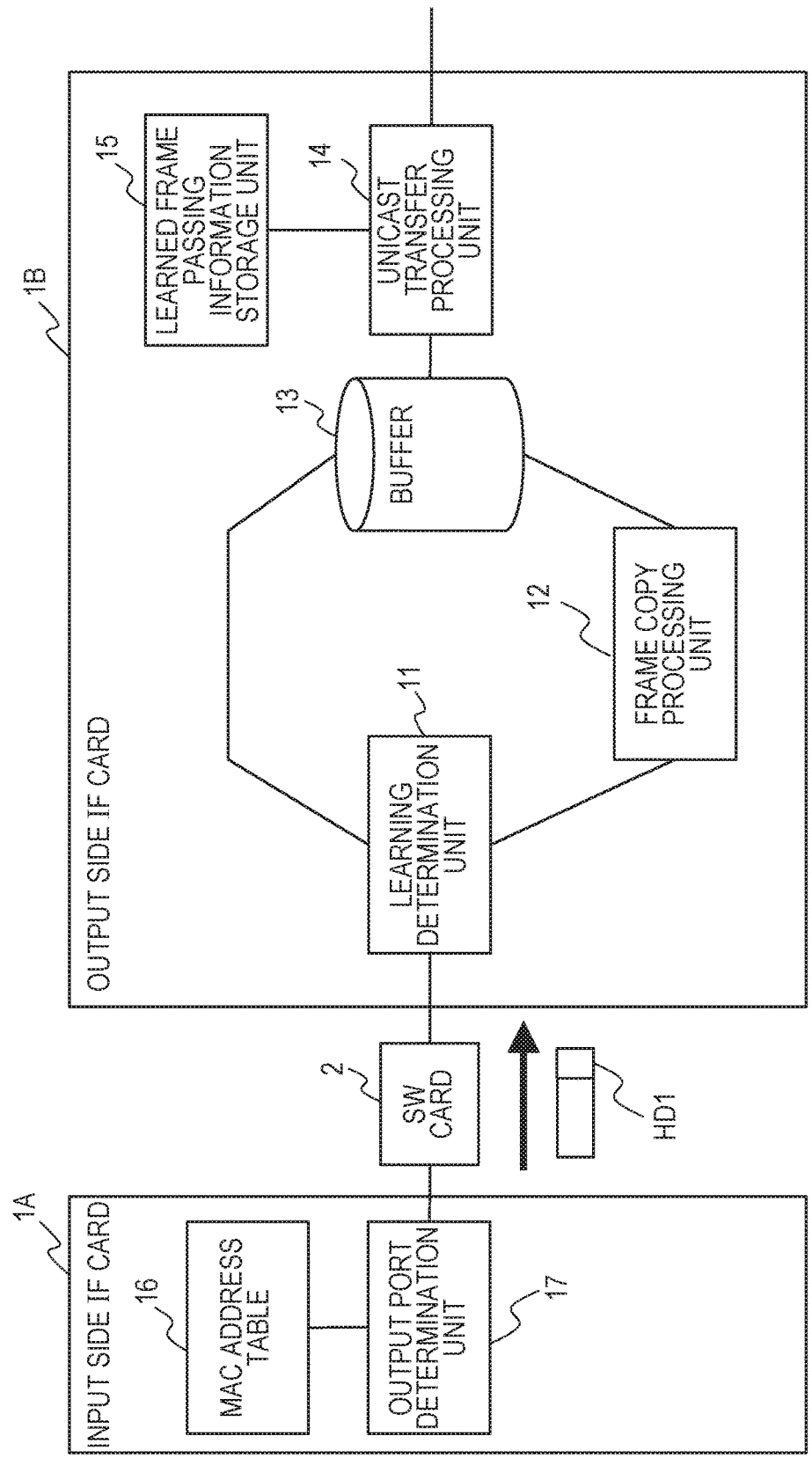
FIG. 11 is a diagram illustrating an example of a functional configuration of the IF cards.

FIG. 11 is a diagram illustrating an example of a functional configuration of the IF card 1. The IF card 1 is divided to an input side IF card 1A and an output side IF card 1B.

Although the input side IF card 1A and the output side IF card 1B are distinguished from one another in view of functional configuration, the input side IF card 1A and the output side IF card 1B may be physically the same IF cards 1, and may be physically different IF cards.

The input side IF card 1A is an IF card that includes a port that receives a frame from a network. The output side IF card 1B is an IF card that includes a port that outputs a frame to a network.

The input side IF card 1A includes a MAC address table 16 and an output port determination unit 17. The MAC address table 16 is a table that holds association between a MAC address and a port to which a device that has the MAC address is coupled. The MAC address table 16 is held in the memory 102. The MAC address table 16 is an example of a "table".

The output port determination unit 17 determines an output port of an input frame. The output port determination unit 17 performs a search for a destination MAC address in the MAC address table 16. If the destination MAC address of the input frame is registered in the MAC address table 16, the output port determination unit 17 determines a port associated with the destination MAC address in the MAC address table 16 as the output port of the input frame. The output port determination unit 17 gives an internal header HD 1 including output port identification information to the input frame, and outputs the input frame to the SW card 2. If the destination MAC address of the input frame is not registered in the MAC address table 16, the output port determination unit 17 gives the internal header HD 1 to the input frame such that a field of the internal header HD 1 in which the output port identification information is to be stored remains empty.

Information that indicates whether a frame is a learned frame or an un-learned frame is also stored in the internal header HD 1. The information that indicates whether a frame is a learned frame or an un-learned frame is represented, for example, by a flag. For example, if the flag in the internal header HD 1 is 1, it is indicated that a frame is a learned frame. For example, if the flag in the internal header HD 1 is 0, it is indicated that a frame is an un-learned frame.

Therefore, the output port determination unit 17 stores, in addition to the output port identification information, information that indicates that a frame is a learned frame or an un-learned frame in the internal header HD 1. Note that, if the destination MAC address of an input frame is registered in the MAC address table 16, the output port determination unit 17 stores information that indicates that the input frame is a learned frame in the internal header HD 1 of the input frame. If the destination MAC address of the input frame is not registered in the MAC address table 16, the output port determination unit 17 stores information that indicates that the input frame is an un-learned frame in the internal header HD 1 of the input frame. The output port determination unit 17 outputs the frame to which the internal header HD 1 has been given to the SW card 2. The output port determination unit 17 is one of functional configurations achieved by the frame processing unit 103.

The SW card 2 transfers a frame to one of the IF cards 1, which includes the output port, in accordance with the output port identification information in the internal header HD 1 of the frame that has been input from the input side IF card 1A.

The output side IF card 1B includes the learning determination unit 11, the frame copy processing unit 12, the buffer 13, the unicast transfer processing unit 14, and the learned frame passing information storage unit 15. The learning determination unit 11, the frame copy processing unit 12, and the unicast transfer processing unit 14 are functional configurations that are achieved by the frame processing unit 103.

The learning determination unit 11 determines whether a frame that is input to the output side IF card 1B is a learned frame or an un-learned frame. The learning determination unit 11 performs determination, based on information that indicates that a frame is a learned frame or an un-learned frame in the internal header HD 1 of the frame, which has been given by the input side IF card 1A. If the frame is a learned frame, the learning determination unit 11 outputs the frame to the buffer 13. If the frame is an un-learned frame, the learning determination unit 11 outputs the frame to the frame copy processing unit 12.

When an un-learned frame is input from the learning determination unit 11, the frame copy processing unit 12 copies the un-learned frame in accordance with the number of ports of the output side IF card 1B. For example, if the input side IF card 1A and the output side IF card 1B are physically different IF cards 1, the reception port of the input frame is not included in the output side IF card 1B. In this case, the frame copy processing unit 12 generates copy frames such that the number of un-learned frames, including the original un-learned frame, is the same as the number of ports included in the output side IF card 1B.

For example, if the input side IF card 1A and the output side IF card 1B are physically the same IF cards 1, the output side IF card 1B includes the reception port of the input frame. In this case, the frame copy processing unit 12 generates copy frames such that the number of un-learned frames, including the original un-learned frame, is a value achieved by subtracting 1 from the number of ports included in the output side IF card 1B. The frame copy processing unit 12 is an example of a "copying unit".

The frame copy processing unit 12 stores identification information of each port of the output side IF card 1B in the internal header HD 1 of each of the original un-learned frame and the copy frames, and outputs the frames to the buffer 13. The internal header HD 1 of a frame that is output by the frame copy processing unit 12 includes the output port identification information and information that indicates that a frame is an un-learned frame.

The buffer 13 is a FIFO queue, and outputs a frame in an order in which frames are stored in the buffer 13. The buffer 13 is a part of the memory 102. The buffer 13 is an example of a "buffer".

The unicast transfer processing unit 14 reads a frame from the buffer 13 at a predetermined timing, and outputs the frame to the output port that is indicated by the internal header HD 1 that has been given to the frame. The details of the unicast transfer processing unit 14 will be described later.

The learned frame passing information storage unit 15 is included in the CAM 106. The learned frame passing information storage unit 15 holds information, such as the destination address of a learned frame that has passed through the unicast transfer processing unit 14 and the like, for a predetermined time period. The details of the learned frame passing information storage unit 15 will be described later. The learned frame passing information storage unit 15 is an example of a "storage".

Figure 12:
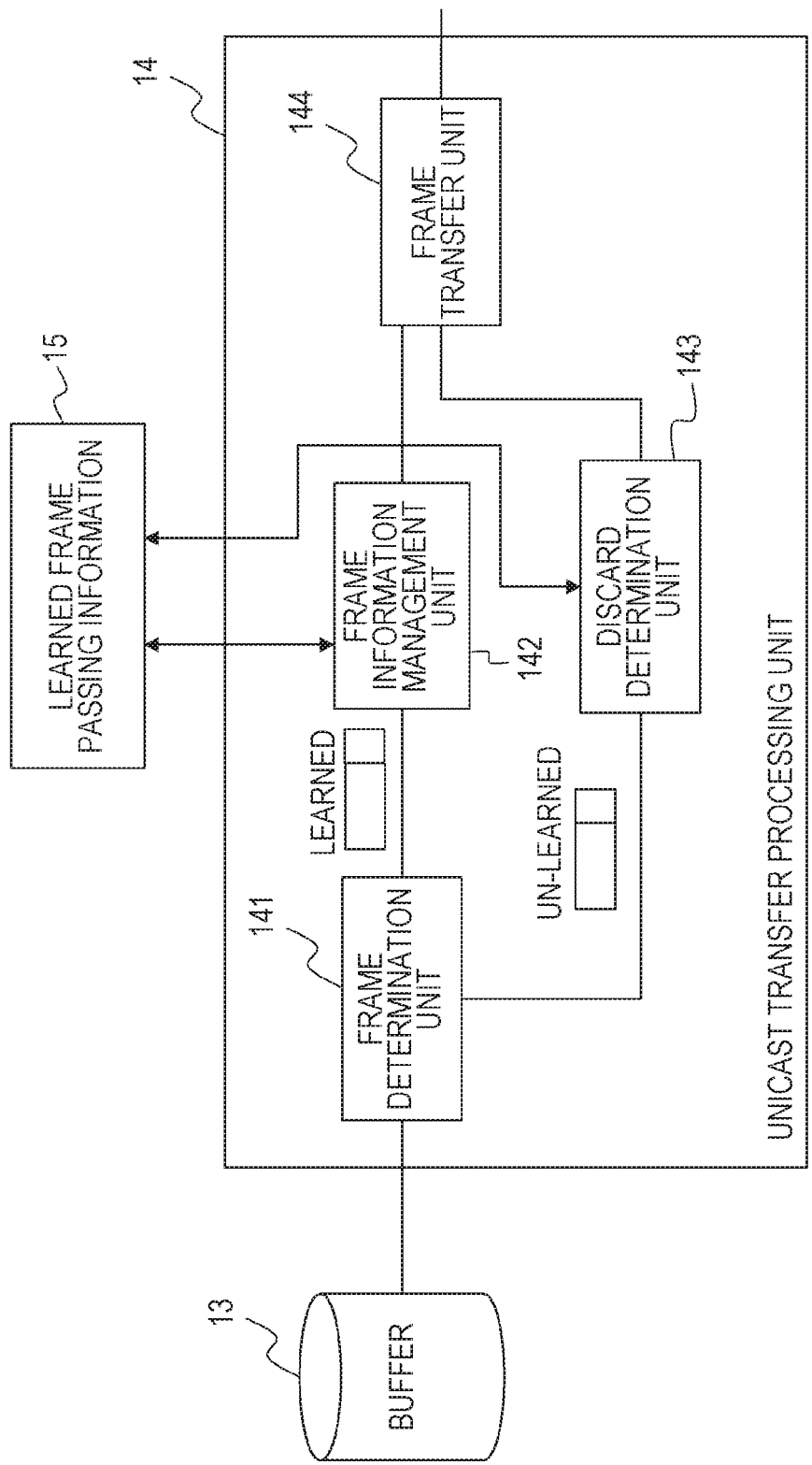
FIG. 12 is a diagram illustrating an example of a configuration of a unicast transfer processing unit.

FIG. 12 is a diagram illustrating an example of a configuration of a unicast transfer processing unit 14. The unicast transfer processing unit 14 includes a frame determination unit 141, a frame information management unit 142, a discard determination unit 143, and a frame transfer unit 144.

The frame determination unit 141 reads a frame from the buffer 13 in the order in which frames have been stored in the buffer 13, and determines whether or not the frame that has been read is a learned frame or an un-learned frame. The determination is performed, based on the information that indicates that a frame is a learned frame or an un-learned frame in the internal header HD 1 of the frame. The frame determination unit 141 is an example of a "determination unit".

If the frame is a learned frame, the frame determination unit 141 outputs the frame to the frame information management unit 142. If the frame is a un-learned frame, the frame determination unit 141 outputs the frame to the discard determination unit 143.

When a learned frame is input from the frame determination unit 141, for example, the frame information management unit 142 performs a search for the destination MAC address of the learned frame in the learned frame passing information storage unit 15. If the destination MAC address of the input learned frame is not registered in the learned frame passing information storage unit 15, the frame information management unit 142 registers the destination MAC address of the learned frame in the learned frame passing information storage unit 15, and outputs the learned frame to the frame transfer unit 144.

If the destination MAC address of the input learned frame is registered in the learned frame passing information storage unit 15, the frame information management unit 142 outputs the learned frame to the frame transfer unit 144. The details of management of the learned frame passing information storage unit 15 that is performed by the frame information management unit 142 will be described later.

When an un-learned frame is input from the frame determination unit 141, the discard determination unit 143 performs a search for the destination MAC address of the un-learned frame in the learned frame passing information storage unit 15. If the destination MAC address of the input un-learned frame is not registered in the learned frame passing information storage unit 15, it is indicated that a learned frame that has the same destination MAC address as that of the un-learned frame has not yet passed through the unicast transfer processing unit 14. That is, it is indicated that reversal of the order of frames between the input order and the output order of the frames has not occurred between the input un-learned frame and the frame that has the same destination MAC address as that of the input un-learned frame. Therefore, in this case, the discard determination unit 143 outputs the input un-learned frame to the frame transfer unit 144.

If the destination address of the input un-learned frame is registered in the learned frame passing information storage unit 15, it is indicated that a learned frame that has the same destination MAC address as that of the un-learned frame has already passed through the unicast transfer processing unit 14. In this case, it is indicated that mismatch between the input order in which frames are input to the frame processing device 100 and the output order of the frames has occurred for the frames that have the same destination address. Also, the destination MAC address of the un-learned frame has been already learned, and therefore, it is highly likely that the un-learned frame is output to a port to which the un-learned frame is not desired to be transferred. Therefore, in this case, the discard determination unit 143 discards the input un-learned frame. The discard determination unit 143 is an example of a "controller".

The frame transfer unit 144 removes the internal header HD 1 of the learned frame that has been input from the frame information management unit 142 or the un-learned frame that has been input from the discard determination unit 143, and outputs the frame to an output port that is indicated by the internal header HD 1. The frame transfer unit 144 is an example of a "transfer unit".

Figure 13:
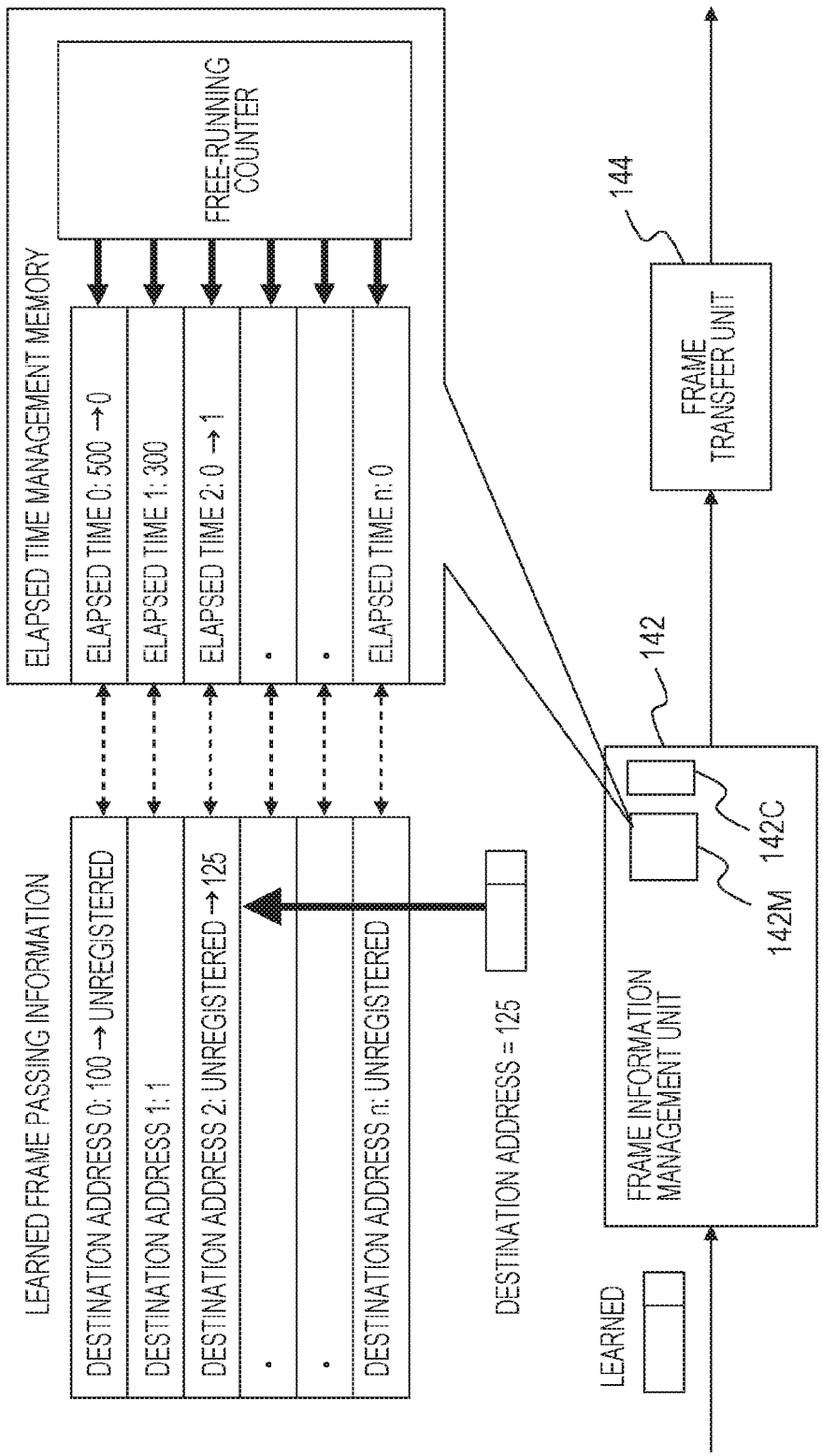
FIG. 13 is a diagram illustrating an example of management processing of learned frame passing information, which is performed by a frame information management unit.

FIG. 13 is a diagram illustrating an example of management processing of the learned frame passing information, which is performed by the frame information management unit 142. The learned frame passing information storage unit 15 is included in the CAM 106. The CAM 106 holds, as the learned frame passing information, the destination MAC address of a learned frame that has passed through the unicast transfer processing unit 14 as an entry.

When a predetermined time has elapsed, the entry of the CAM 106 is removed. A period in which the destination MAC address of the learned frame that has passed through the unicast transfer processing unit 14 is held in the CAM 106 is, for example, a period until un-learned frames, which are copy frames having the destination MAC address, are all transferred. More specifically, the frame information management unit 142 includes an elapsed time management memory 142M and a free-running counter 142C, and manages, in the elapsed time management memory 142M, a holding period of a destination MAC address as the learned frame passing information in the CAM 106.

Each entry of the elapsed time management memory 142M is associated with the corresponding entry of the CAM 106, and an elapsed time since registration of the corresponding entry of the CAM 106 is held. The free-running counter 142C is a counter that adds 1 to a count value in predetermined cycles. The count value of the free-running counter 142C plays a role as an entry pointer of the elapsed time management memory 142M.

Specifically, for example, if the count value of the free-running counter 142C is 1, the head entry of the elapsed time management memory 142M is indicated. If the count value of the free-running counter 142C is 2, the second entry of the elapsed time management memory 142M is indicated. If the value of the free-running counter 142C indicates the last entry of the elapsed time management memory 142M, a next value of the free-running counter 142C indicates the head entry of the elapsed time management memory 142M. That is, the free-running counter 142C goes round through the entries of the elapsed time management memory 142M. In the first embodiment, the elapsed time since registration of the corresponding entry of the CAM 106, which is stored in an entry of the elapsed time management memory 142M, is managed in accordance with the number of times the free-running counter 142C goes round through the entries.

In each entry of the elapsed time management memory 142M, 0 is held in a period until a destination MAC address is registered in the corresponding entry of the CAM 106. In each entry of the elapsed time management memory 142M, when a destination MAC address is registered in the corresponding entry of the CAM 106, the registration triggers for counting the number of times the free-running counter 142C goes round, and the value of the count is stored.

For a value that is stored in an entry of the elapsed time management memory 142M, that is, the value of the count of the number of times the free-running counter 142C goes round, a threshold is set. When the value that is stored in the memory of the elapsed time management memory 142M exceeds the threshold, the value that is stored in the corresponding entry of the elapsed time management memory 142M is reset to 0. Also, the destination MAC address that is registered in the entry of the CAM 106, which corresponds to the entry of the elapsed time management memory 142M, is removed.

In the example of FIG. 13, in the learned frame passing information storage unit 15, "100" is stored in the entry of a destination address 0, and "1" is stored in the entry of a destination address 1. Note that, although it is a MAC address that is actually stored in each entry into the learned frame passing information storage unit 15, in FIG. 13, for convenience, a simple number is stored, instead of the MAC address. The entry of a destination address 2 of the learned frame passing information is unregistered.

In FIG. 13, the entries of elapsed times 0, 1, 2, . . . of the elapsed time management memory 142M correspond to the entries of destination addresses 0, 1, 2, . . . of the learned frame passing information, respectively.

For example, when a learned frame of a destination MAC address "125" is input to the frame information management unit 142, since the destination MAC address is unregistered in the learned frame passing information storage unit 15, the frame information management unit 142 registers the destination MAC address "125" in the learned frame passing information storage unit 15. In FIG. 13, the destination MAC address "125" is stored in the entry of the destination address 2 of the learned frame passing information.

The frame information management unit 142 registers the destination MAC address "125" in the learned frame passing information storage unit 15, and also, sets 1 in the entry of an elapsed time 2, which is the corresponding entry of the elapsed time management memory 142M. Thereafter, each time the value of the free-running counter 142C indicates the entry of the elapsed time 2, the value of the elapsed time 2 increases by one.

In the example of FIG. 13, it is assumed that the threshold of the value of an entry of the elapsed time management memory 142M is 500. The value of the entry of the elapsed time 0 of the elapsed time management memory 142M is 500, and therefore, the frame information management unit 142 resets the value of the entry of the elapsed time 0 to 0, and removes an address that is registered in the corresponding entry of the destination address 0 of the learned frame passing information.

The capacity of the CAM 106 may be reduced to a small capacity by removing the entry into the learned frame passing information storage unit 15 for which a predetermined time has elapsed. The capacity of the CAM 106 may be larger than a capacity corresponding to the number of frames that may be stored in the buffer 13. This is for responding a case where destination MAC addresses of frames that are stored in the buffer 13 are all different.

Processing Flow

Figure 14:
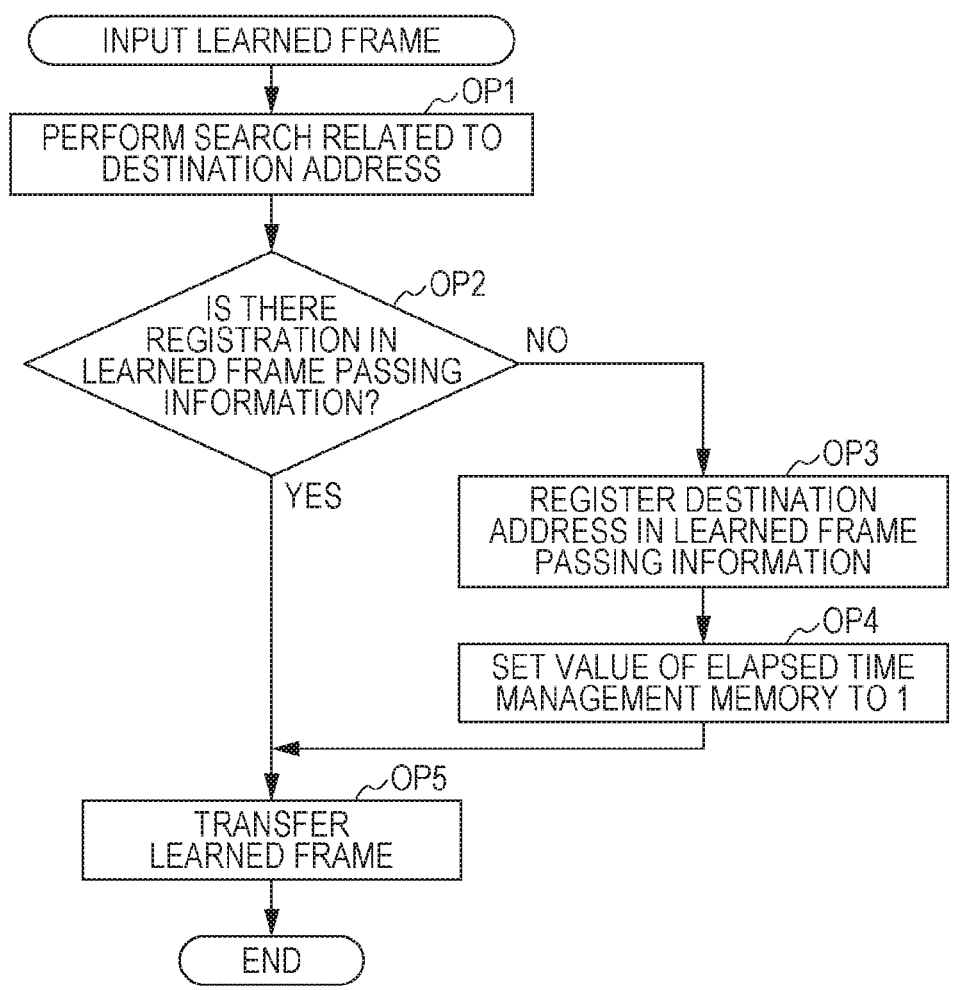
FIG. 14 is an example of a flow chart of processing that is performed by a frame information management unit when a learned frame is input.

FIG. 14 is an example of a flow chart of processing that is performed by the frame information management unit 142 when a learned frame is input. The processing illustrated in FIG. 14 is started when a learned frame is input to the frame information management unit 142 from the frame determination unit 141.

In OP1, the frame information management unit 142 performs a search for the destination MAC address of the input learned frame in the learned frame passing information storage unit 15. If there is an entry that holds a MAC address that matches the destination MAC address of the input learned frame, as a search result, "data is present" is returned to the frame information management unit 142 from the learned frame passing information storage unit 15. If there is not an entry that holds an address that matches the destination address of the input learned frame, as a search result, "data is not present" is returned to the frame information management unit 142 from the learned frame passing information storage unit 15.

In OP 2, the frame information management unit 142 determines whether or not the destination MAC address of the input learned frame is registered in the learned frame passing information storage unit 15. If the destination MAC address of the input learned frame is registered in the learned frame passing information storage unit 15 (YES in OP2), the process proceeds to OP5. If the destination MAC address of the input learned frame is not registered in the learned frame passing information storage unit 15 (NO in OP2), the process proceeds to OP3.

In OP3, the frame information management unit 142 registers the destination MAC address of the input learned frame in the learned frame passing information storage unit 15. For example, the frame information management unit 142 registers the destination MAC address of the input learned frame in a top entry, among empty entries of the CAM 106.

In OP 4, the frame information management unit 142 sets 1 in an entry of the elapsed time management memory 142M, which corresponds to the entry into the learned frame passing information storage unit 15 in which the destination MAC address of the learned frame is registered in OP3.

In OP5, the frame information management unit 142 outputs the input learned frame to the frame transfer unit 144. Thereafter, the processing illustrated in FIG. 14 is terminated.

Figure 15:
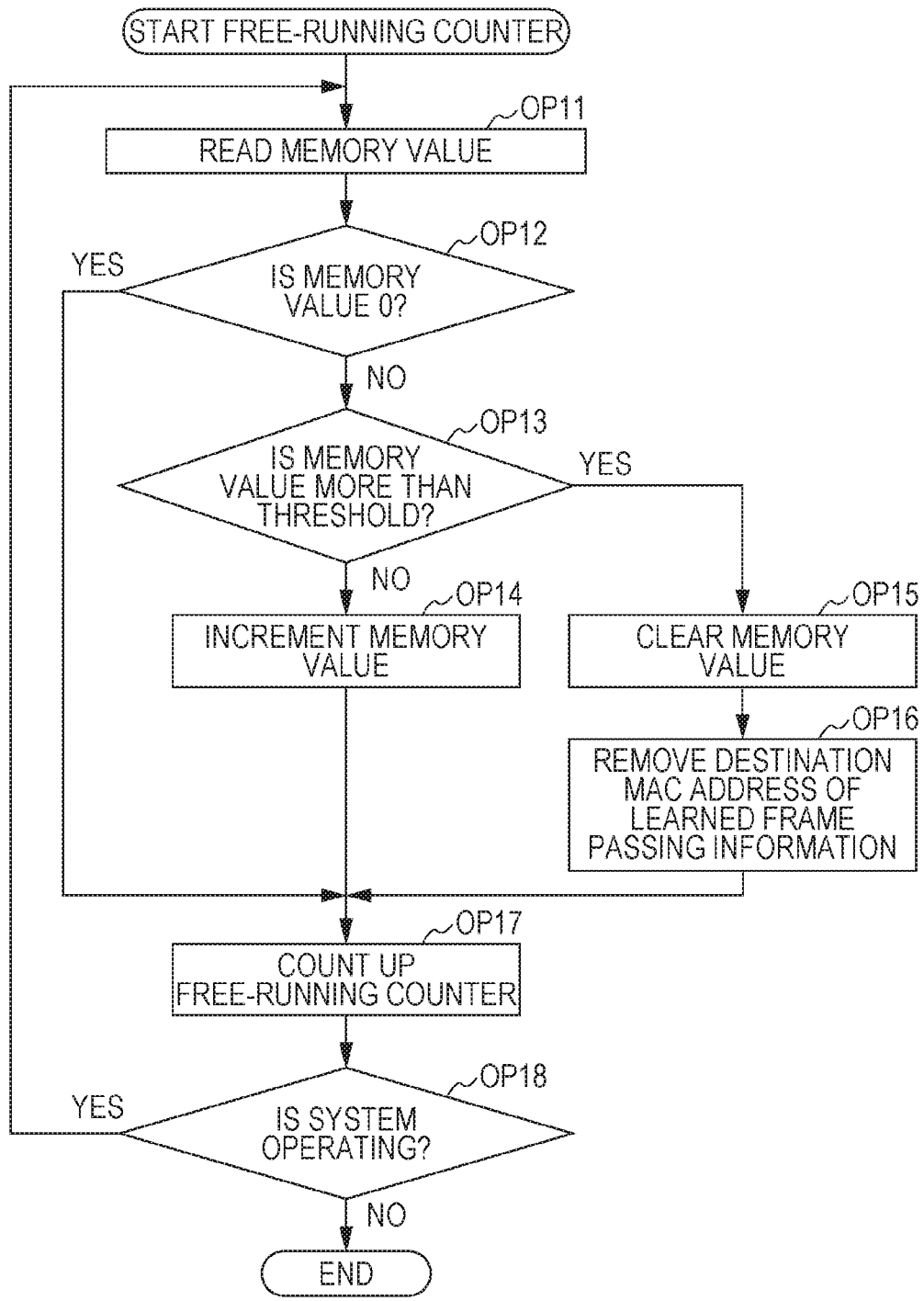
FIG. 15 is an example of a flow chart of management processing of learned frame passing information, which is performed by the frame information management unit.

FIG. 15 is an example of a flow chart of management processing of the learned frame passing information, which is performed by the frame information management unit 142. The processing illustrated in FIG. 15 is started simultaneously with a start of the free-running counter 142C, that is, a start-up of the IF card 1.

In OP 11, the frame information management unit 142 reads the value of an entry of the elapsed time management memory 142M, which is indicated by the free-running counter 142C. The initial value of the free-running counter 142C is 1 and, if the free-running counter 142C is 1, the head entry of the elapsed time management memory 142M is indicated.

In OP12, the frame information management unit 142 determines whether or not the value of the entry of the elapsed time management memory 142M, which has been read, is 0. If the value of the entry of the elapsed time management memory 142M, which has been read, is 0 (YES in OP12), the process proceeds to OP17. If the value of the entry of the elapsed time management memory 142M, which has been read, is not 0 (NO in OP12), the process proceeds to OP13.

In OP 13, the frame information management unit 142 determines whether or not the value of the entry of the elapsed time management memory 142M, which has been read, is equal to or more than the threshold. If the value of the entry of the elapsed time management memory 142M, which has been read, is equal to or more than the threshold (YES in OP13), the process proceeds to OP15. If the value of the entry of the elapsed time management memory 142M, which has been read, is less than the threshold (NO in OP13), the process proceeds to OP14.

In OP 14, since the value of the entry of the elapsed time management memory 142M, which has been read, is less than the threshold, the frame information management unit 142 adds 1 to the value of the entry.

In OP 15, since the value of the entry of the elapsed time management memory 142M, which has been read, is equal to or more than the threshold, the frame information management unit 142 sets the value of the entry back to 0.

In OP16, the frame information management unit 142 removes the destination MAC address of an entry into the learned frame passing information storage unit 15, which corresponds to the entry of the elapsed time management memory 142M, which has been read.

In OP 17, the frame information management unit 142 adds (counts up) 1 to the value of the free-running counter 142C. Thus, a reference entry of the elapsed time management memory 142M proceeds to a next entry.

In OP 18, the frame information management unit 142 determines whether or not the IF card 1 is operating. If the IF card 1 is operating (YES in OP18), the process proceeds to OP11, and processing of OP11 and subsequent processing are performed on the next entry of the elapsed time management memory 142M. If the IF card 1 is stopped (NO in OP18), the processing illustrated in FIG. 15 is terminated.

Figure 16:
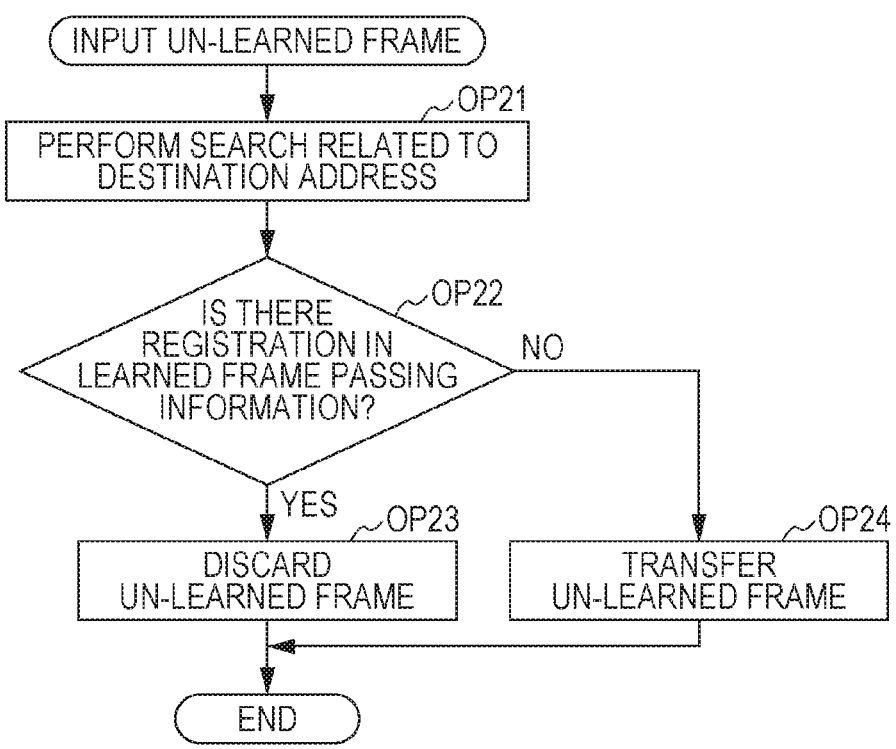
FIG. 16 is an example of a flow chart of processing that is performed by a discard determination unit when an un-learned frame is input.

FIG. 16 is an example of a flow chart of processing that is performed by the discard determination unit 143 when an un-learned frame is input. When an un-learned frame is input to the discard determination unit 143 from the frame determination unit 141, the processing illustrated in FIG. 16 is started.

In OP21, the discard determination unit 143 performs a search for the destination MAC address of the input un-learned frame in the learned frame passing information storage unit 15. If there is an entry that holds a MAC address that matches the destination MAC address of the input un-learned frame, as a search result, "data is present" is returned to the discard determination unit 143 from the learned frame passing information storage unit 15. If there is not an entry that holds a MAC address that matches the destination MAC address of the input un-learned frame, as a search result, "data is not present" is returned to the discard determination unit 143 from the learned frame passing information storage unit 15.

In OP 22, the discard determination unit 143 determines whether or not the destination MAC address of the input un-learned frame is registered in the learned frame passing information storage unit 15. If the destination MAC address of the input un-learned frame is registered in the learned frame passing information storage unit 15 (YES in OP22), the process proceeds to OP23. If the destination MAC address of the input un-learned frame is not registered in the learned frame passing information storage unit 15 (NO in OP22), the process proceeds to OP24.

In OP 23, since the destination MAC address of the input un-learned frame is registered in the learned frame passing information storage unit 15, the discard determination unit 143 discards the un-learned frame. Thereafter, the process illustrated in FIG. 16 is terminated.

In OP 24, since the destination MAC address of the input un-learned frame is not registered in the learned frame passing information storage unit 15, the discard determination unit 143 transfers the un-learned frame to the frame transfer unit 144. Thereafter, the process illustrated in FIG. 16 is terminated.

Advantages of First Embodiment

In the first embodiment, the history of processing of outputting a learned frame to a network is recorded and, in transferring an un-learned frame, whether or not there is the history of processing of outputting a frame of the same destination MAC address as that of the un-learned frame is checked, thereby detecting reversal of the order of frames between the input order and the output order of the frames. If there is the history of processing of outputting a learned frame of the same destination MAC address as that of the un-learned frame, it is indicated that the learned frame was output to the network before the un-learned frame, and thus, it is indicated that reversal of the order of frames between the input order and the output order of the frames has occurred. In this case, the un-learned frame is discarded. Thus, frames are not output to the network in a reverse order of the input order.

If there is the history of processing of outputting a learned frame of the same destination MAC address as that of the un-learned frame, the un-learned frame is discarded. An un-learned frame that is input to the unicast transfer processing unit 14 is a frame the destination MAC address of which may be possibly output from a port other than a port to which the destination MAC address is coupled. Therefore, according to the first embodiment, after address learning, a frame that is not desired to be output to the network is not output and, as a result, the band of the network is not wasted.

Also, a learned frame that has a destination MAC address immediately after the destination MAC address is changed from an un-learned state to a learned state is transferred without being delayed, and therefore, according to the first embodiment, network transfer speed may be maintained.

In the first embodiment, the CAM 106 is used for holding the learned frame passing information that is the history of processing of outputting of a learned frame to a network. Since CAM is a high speed memory, according to the first embodiment, reversal of the order of frames between the input order and the output order of the frames may be detected without reducing frame transfer speed.

Also, when a predetermined time has elapsed, an entry into the learned frame passing information storage unit 15, which is stored in the CAM 106, is removed. Thus, the capacity of the CAM 106 may be saved.

Modified Example

Although, in the first embodiment, assuming that the frame processing unit 103 is an NPU or an FPGA, the frame processing unit 103 has been described, the frame processing unit 103 may be a central processing unit (CPU). When the frame processing unit 103 is a CPU, a program that causes the CPU to execute processing of the unicast transfer processing unit 14 (the frame determination unit 141, the frame information management unit 142, the discard determination unit 143, and the frame transfer unit 144) is stored in a nonvolatile memory that is mounted in the IF card 1 or externally attached to the IF card 1.

The first embodiment may be modified, for example, in the following manner. A configuration in which the frame copy processing unit 12 may perform a search in the learned frame passing information storage unit 15 may be employed. If the destination MAC address of an un-learned frame that has been input to the frame copy processing unit 12 is registered in the learned frame passing information storage unit 15, the frame copy processing unit 12 discards the un-learned frame without copying the un-learned frame. Thus, a copy frame that is not desired to be transferred is not stored in the buffer 13, and the occurrence of reversal of the order of frames between the input order and the output order of the frames, which occurs due to change of the learning state of a destination MAC address from an un-learned state to a learned state, may be reduced. In the above-described modified example, the frame copy processing unit 12 is an example of "the control unit", and the unicast transfer processing unit 14 is an example of "the transfer unit".

Note that, in the first embodiment, although a virtual local area network (VLAN) is not considered, even when a VLAN is set, the technology described in the first embodiment may be applied. When a VLAN is set, the entries of the MAC address table 16 are a MAC address, a port, and VLAN ID in association with one another. Also, the learned frame passing information storage unit 15 may be configured such that, in addition to the destination MAC address of a learned frame that has passed through the unicast transfer processing unit 14, VLAN ID is registered. In this case, the frame information management unit 142 and the discard determination unit 143 perform searches for the destination MAC address and VLAN ID of the frame in the learned frame passing information storage unit 15.

As another alternative, the learned frame passing information storage unit 15 may be configured to store, instead of the destination MAC address, a flow ID that is used in the frame processing device 100. For example, the same flow ID is given to frames the destination MAC address, the transmission source MAC address, the VLAN ID, and the like of which are the same. The flow ID is determined, for example, by the output port determination unit 17 of the input side IF card 1A, and is stored in the internal header HD 1 of the frame.

Although, in the first embodiment, assuming an Ethernet network, the description has been given, the technology that has been described in the first embodiment may be applied to a network other than the Ethernet network. The technology that has been described in the first embodiment may be applied to a network other than the Ethernet network by replacing the configurations of a MAC address, a MAC address table, and a frame, and the like with equivalent ones that are used in the network to which the technology is applied, as appropriate.

Recording Medium

A program that realizes one of the above-described functions on a computer, or some other machine or device (which will be hereinafter referred to as a computer or the like) may be recorded in a recording medium that is readable by a computer or the like. The function may be provided by causing the computer or the like to read and execute the program recorded in the recording medium.

A recording medium that is readable by a computer or the like herein is a nontemporary recording medium that is capable of storing information, such as data, a program, and the like, by utilizing an electrical, magnetic, optical, mechanical, or chemical effect, and from which the information may be read by the computer or the like. Among such recording mediums, examples of a recording medium that may be attached and removed to and from the computer or the like include, for example, a memory card, such as a flexible disk, an magnetooptical disk, a CD-ROM, a CD-R/W, a DVD, a Blu-ray disk, a DAT, an 8 mm tape, a flash memory, and the like, and the like. Also, examples of a recording medium fixed to the computer or the like include a hard disk, a read-on-memory (ROM), and the like. Furthermore, a solid state drive (SSD) may be used both as a recording medium that may be attached and removed to and from the computer or the like and as a recording medium fixed to the computer or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A frame processing device comprising:
   a plurality of output ports each from which a first frame having a destination address is output to a network;
   a table in which the destination address is stored in association with an output port of the plurality of output ports;
   a buffer configured to store a learned frame for which it is determined that the destination address is registered in the table, an un-learned frame for which it is determined that the destination address is not registered in the table, and a copy frame generated by copying the un-learned frame;
   a processor or a circuit configured to read a second frame from the buffer in an order in which the second frame is stored and transfer the second frame to a predetermined output port of the plurality of output ports, the second frame being one of the learned frame, the un-learned frame, or the copy frame;
   a storage configured to store the destination address of the learned frame; and
   a controller configured to discard the second frame to be transferred by the processor or the circuit, when the second frame is the un-learned frame and the destination address of the second frame is stored in the storage,
   wherein the second frame transferred to the plurality of output ports is output as the first frame.

2. The frame processing device according to claim 1, wherein, when the second frame is the learned frame and the destination address of the learned frame is not stored in the storage, the controller controls the storage to store the destination address of the learned frame, and removes, after a predetermined time has elapsed since the storing, the destination address of the learned frame from the storage.

3. The frame processing device according to claim 2, wherein the storage is a content addressable memory (CAM).

4. The frame processing device according to claim 3, wherein a capacity of the storage is same as a capacity of the buffer.

5. The frame processing device according claim 1, further comprising:
   the processor or the circuit being further configured to determine whether the second frame is the learned frame or the un-learned frame, and store the second frame in the buffer when the second frame is the learned frame; and
   the processor or the circuit being further configured to generate the copy frame of the un-learned frame and store the un-learned frame and the copy frame in the buffer when the second frame is the un-learned frame.

6. A frame processing method of a frame processing device configured to include
   a plurality of output ports each from which a first frame having a destination address is output to a network,
   a table in which the destination address is stored in association with an output port of the plurality of output ports, and a buffer configured to store a learned frame for which it is determined that the destination address is registered in the table, an un-learned frame for which it is determined that the destination address is not registered in the table, and a copy frame generated by copying the un-learned frame, the frame processing method comprising:

reading a second frame from the buffer in an order in which the second frame is stored;

transferring the second frame to a predetermined output port of the plurality of output ports;

storing the destination address of the learned frame; and discarding the second frame to be transferred, when the second frame is an un-learned frame and the destination address of the second frame is stored, wherein the second frame is one of the learned frame, the un-learned frame, or the copy frame, and the second frame transferred to the plurality of output ports is output as the first frame.

7. A frame processing device comprising:

a plurality of output ports each from which a first frame having a destination address is output to a network;

a table in which the destination address is stored in association with an output port of the plurality of output ports;

a buffer configured to store a learned frame for which it is determined that the destination address is registered in the table, an un-learned frame for which it is determined that the destination address is not registered in the table, and a copy frame generated by copying the un-learned frame;

a storage configured to store a procedure for processing a frame; and a processor configured to execute the procedure by:

reading a second frame from the buffer in an order in which the second frame is stored;

transferring the second frame to a predetermined output port of the plurality of output ports;

storing the destination address of the learned frame; and discarding the second frame to be transferred, when the second frame is an un-learned frame and the destination address of the second frame is stored, wherein the second frame is one of the learned frame, the un-learned frame, or the copy frame, and the second frame transferred to the plurality of output ports is output as the first frame.

8. The frame processing device according to claim 7, the procedure further including:

when the second frame is the learned frame and the destination address of the learned frame is not stored, storing the destination address of the learned frame; and removing, after a predetermined time has elapsed since the storing, the destination address of the learned frame.

9. The frame processing device according claim 7, the procedure further including:

determining whether the second frame is the learned frame or the un-learned frame;

storing the second frame in the buffer when the second frame is the learned frame;

generating the copy frame of the un-learned frame; and storing the un-learned frame and the copy frame in the buffer when the second frame is the un-learned frame.

* * * * *